April 26, 1966  G. E. KUNKLE ETAL  3,247,626
GLASS PLANING PROCESS
Filed April 30, 1963  2 Sheets-Sheet 2
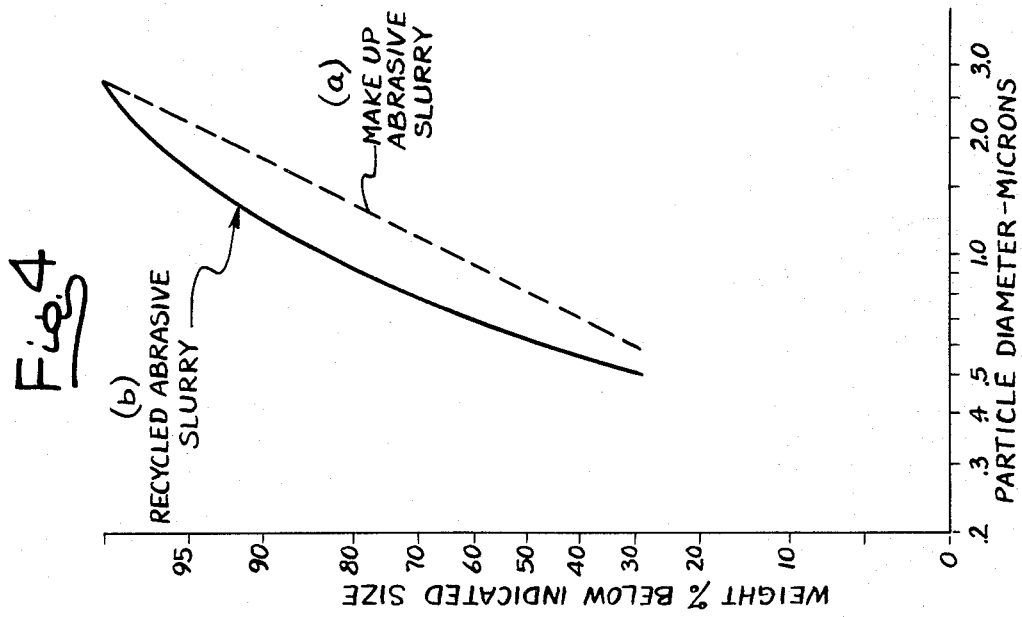
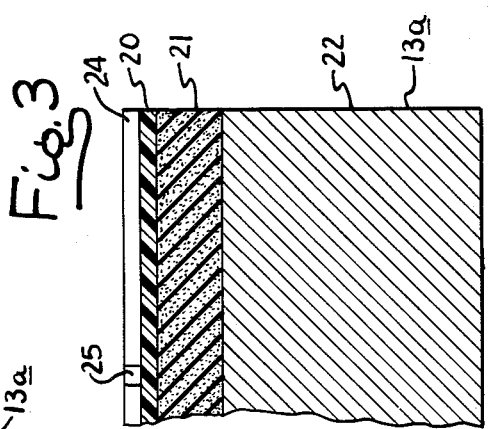
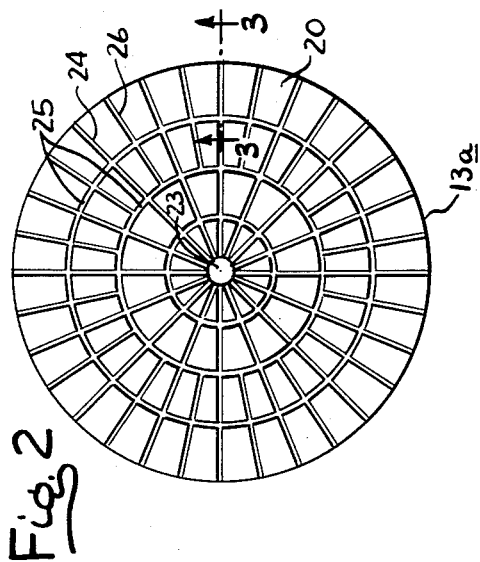
INVENTORS
GERALD E. KUNKLE
WILLIAM C. HARRELL
BY
Oscar H Spencer
ATTY.

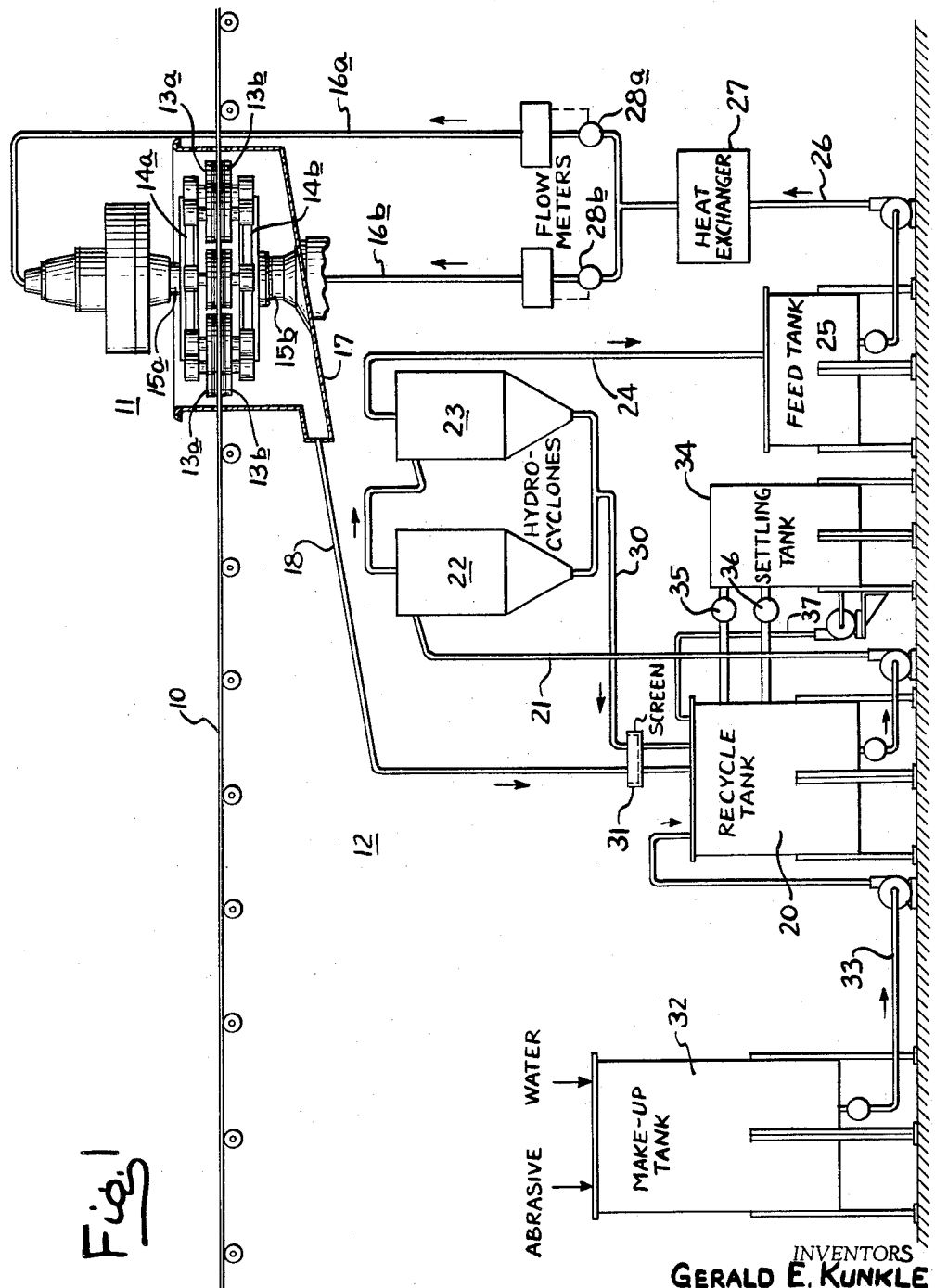

United States Patent Office 3,247,626
Patented Apr. 26, 1966

3,247,626
GLASS PLANING PROCESS
Gerald E. Kunkle, New Kensington, and William C. Harrell, Arnold, Pa., assignors to Pittsburgh Plate Glass Company, Pittsburgh, Pa., a corporation of Pennsylvania
Filed Apr. 30, 1963, Ser. No. 276,751
4 Claims. (Cl. 51—283)

This invention relates to the removal of flat glass surface defects by planing the glass as distinguished from conventional polishing.

Very small departures from planeness in the surfaces of a flat glass ribbon detract from its value to the extent that they scatter transmitted or reflected light to reduce the transparency of the glass or distort what is seen through the glass. These defects are usually very closely related to the manufacturing process—conventionally one in which the plate glass ribbon is ground under rotary iron runners with sand to remove large departures from surface planeness and subsequently polished under rotary felt runners with rouge to remove the grinding pits and fissures and restore transparency. A manufacturing process which makes the glass sides planar on a large or macroscale without grinding would remove the principal basis for polishing. One such process, for example, is the manufacture of glass by a float process in which a sized flat glass ribbon is supported while plastic on a molten metal bath. Nevertheless, surface defects have been found to remain on both the fire-finished upper side and float-supported lower side of float glass sheets. Upon analysis, the principal defects are very shallow depressions, i.e., usually under ten millionths of an inch and thousands of times as wide as they are deep. Typically, numerous adjacent elongated depressions are found. The glass surface has an undulating profile, and the condition may be aptly referred to as a wave defect.

Polishing, in the meaning of the term as historically employed in plate glass manufacture, has been found to be relatively ineffective for removing such wave defects. For the most part, felt polishing generally accomplishes its purpose when an average glass thickness of several times the grinding pit depth is removed. That is, the high areas of the glass are removed at a rate sufficiently greater than from the low areas of the glass corresponding to the grinding pit bottoms to eventually provide an optically pleasing or "smooth as glass" surface. The felt polishing process effectively operates on an established ground glass plane having relatively narrow, deep or steep-sided defects when the polishing process begins. On a gradually undulating surface, on the other hand, conventional polishing approaches complete ineffectiveness, apart from removing discontinuities in the undulating surface, since glass is removed just as efficiently from the lower surfaces as from the higher.

Conventional felt polishing is similarly ineffective for similar shallow defects from ground and polished glass. Indeed, the shallow, or wave type defect condition may sometimes be introduced by uneven operation of the polishing runner. The likelihood of creating such defects in polishing is increased when the abrasive is assisted by chemical attack.

Our invention is addressed to the removal of small shallow or wave type surface defects and to the provision of an improved process for doing so.

More particularly it is an object of our invention to provide a process for efficiently planing float glass having wide, shallow defect depressions or waves.

It is also an object to supplant or supplement conventional polishing in a flat glass production line by finish planing of the glass.

It is another object to economically upgrade float glass having wave type defects by planing.

Various objects and advantages of the invention will become apparent from the following detailed description illustrated in the accompanying drawings in which:

FIGURE 1 is a schematic view of a planing apparatus together with abrasive supply and recovery apparatus;

FIG. 2 is a bottom view of an upper block of the FIG. 1 apparatus;

FIG. 3 is a greatly enlarged view along line 2—2 of FIG. 3; and

FIG. 4 is a representation of a typical particle size distribution before and after slurry conditioning.

It will be apparent to those skilled in the art that variations can and will be made to meet various conditions or existing requirements of particular manufacturing installations. The intention here, of course, is to cover and secure all modifications, alternatives, constructions or equivalents within the spirit and scope of the invention as expressed in the appended claims.

I. THE PROCESS

Very briefly, in the practice of the invention the wave type defects are planed from flat glass to leave it in a finished condition by working the glass with hard surfaced plastic polishing blocks and a slurry of very finely divided rare earth abrasives. The quality standards referred to are those of high quality plate glass and the quantity, production rates, and costs are necessarily consistent or competitive with large scale plate glass manufacture. The process and the equipment superficially resemble those of conventional plate glass polishing, and the amount of glass and cost per amount economically removed per runner by planing is of the same order of magnitude as in plate glass polishing. The overall cost is less because fewer runners are required. However, the planing process and apparatus differ significantly from those for polishing, both in the result obtained and the manner and means of obtaining it. Since the planing of glass as an overall objective in grinding and polishing is an old one, its achievement in accordance with the invention in a specific and accurate sense can be better appreciated by analysis of the condition of the glass to be planed and the surface quality required of glass planed to a finish condition.

(a) The defect condition to be planed

The defect condition to be removed by finish planing can exist under quite different conditions of flat glass manufacture. As stated, the wave type defect condition here treated consists of very shallow depressions in a generally smooth glass surface. Their depth, as measured with respect to the highest adjacent levels of the glass are usually in the order of one or two-tenths of a micron (four to eight micro-inches), although deeper ones up to one micron can be found. Greater wave depths usually represent large area defect conditions traceable to early manufacturing steps and economically remedied there, since planing is useful by reason of its controlled selectivity rather than high bulk removal rate. The minimum depression depth sufficient to constitute a defect condition depends to some extent on the quality standard and also upon the number and distribution of the defects (a cluster of minor defects being more noticeable than a minor defect). The "smooth as glass" planeness is reached for all practical purposes in large scale flat glass manufacture at some permissible planeness departure slightly above zero but well below one-tenth micron. As a convenient rule of thumb, depression depths of up to one micron may be considered those to which the present planing invention is advantageously directed.

The characterization of the defect depression as shallow refers not only to absolute depth but also to the very small angle of deviation of the defect side walls from the plane of the glass. The narrowest width dimension (i.e. the closest distance between two high areas of the glass) rather than its broadest is the critical one since it refers to the maximum side wall slope. Characteristically, the ratio of narrowest width to depth in the defect condition under attack is of the order of not less than ten thousand to one. It can be appreciated that the grade or slope involved is too small to be directly observed or measured. It does cause transmitted light to be bent and thus distract the viewer. A one hundred thousand to one ratio of width to depth has been found objectionable in float glass waves—i.e. where the width is approximately ten millimeters and the depth one-tenth micron. A soft polishing tool, such as felt, passing over such a depression readily conforms to the glass profile. It will be appreciated also that the defects are not created as steep-sided sudden discontinuities of the glass level.

The remaining dimension, the longer dimension across the depression, is helpful in discovering the defect condition and its cause. Thus, the length dimension may be very long, resembling a straight furrow in the glass as when the defect is a squeegee mark left during a chemical prepolishing process as described and claimed in U.S. Letters Patent No. 2,936,554, granted May 17, 1960, and assigned to the assignee of the present invention. Such defects may appear singly, or in characteristically unevenly spaced parallel array. Long, uniformly spaced straight furrows may occur in float glass, particularly on the float supported side and presumably introduced while the newly poured glass is still plastic. The defect condition has a characteristic wave-like pattern. Arcuate wave patterns ("sweep") in ground and polished glass may be sometimes traced to rotary grinding or polishing runner marks caused, apparently when the runners are unbalanced, subject to vibration, or otherwise imperfectly controlled. Such arcuate or sweep wave defects are particularly likely to be produced and perpetuated by the felt runner in the presence of a chemically assisted polishing abrasive as in the process described in U.S. Letters Patent No. 2,936,555, which issued May 17, 1960, to the assignee of the present invention. In some instances, the defect takes on a pebbled ("orange peel") appearance. The slope of the defect depression along the length dimension is likely to be indistinguishable from zero except in the "orange peel" case, but planing rather than polishing is the remedy for the different varieties of the shallow or wave type defect.

(b) *The finished surface condition*

Absence of surface imperfections in flat glass causing distraction to the user in glazing or mirror applications is the ultimate quality test. This is a subjective test without precisely measurable limits, since the individual defects themselves are not individually and directly perceived by the user. Distinction of the kind of defect is greatly assisted by special techniques, however. Thus, the shallow defects discussed above are readily observed by projecting light from a point source through the glass sample against a screen and observing the interference patterns. Grinding pits or fissures are very difficult or impossible to detect by this method. Another test, edge-lighting of the glass, reveals grinding pits or other steep sided defects not observable in the point source projection test, but does not indicate the shallow or wave defects. Tests of these two general types are thus useful to distinguish the two types of defects from each other. They also indicate whether polishing or planing is called for upon examination of float glass, or whether planing or further polishing would be useful in the case of ground and polished (or partially polished) plate glass.

The glass is finished when the distractions are gone. The prospects for doing so require that an appreciable degree of the planing efficiency be retained until the desired limit is approached. Planing efficiency is defined for the purpose of this description as the ratio of the amount by which the defect depth is decreased to the overall depth of glass removal. It is measured in before and after weighing and depth probing of a glass area having an isolated defect. This planing efficiency must be effective to reduce the shallow defect condition existing with a depression depth of up to one-half to one micron and a minimum defect width of ten thousand on one hundred thousand times that depth. If the very shallow depression or wave type condition of the still objectionable severity indicated above is somehow reached during conventional polishing, the planing efficiency of conventional polishing is too near to zero under these conditions to remove the defect. In the planing method here described, an efficiency of at least 50% is obtained in working glass containing such wave defects, and efficiencies of the order of 75% may be expected. That this indeed a high efficiency may be appreciated by the fact that if glass having the same type defects is subjected to polishing by conventional methods and a glass layer up to ten times the initial defect depth is removed, the defect will still be present.

(c) *The planing tool*

In planing the glass with finely divided particles described in particular detail in later paragraphs herein, the particles are rubbed between the high surfaces of the glass and the surface of a planing tool. The planing action obtained with the specified abrasive under the planing tool also assumes certain general prerequisites of the tool—namely, durability, effective glass removal, avoidance of sleeking or scratching of the glass surface being planed, and freedom from critical and difficult pressure, velocity, or temperature conditions. The satisfaction of the process conditions for planing and the general tool prerequisites are satisfied under singularly narrow conditions which we believe best analyzed in terms of (a) the tool composition, and (b) the tool surface design.

Looking first to the tool material, the requirements are uniquely met by an elastomer of a hardness, density, and elasticity balance characterized by a Shore D hardness within a preferred range of 80 to 87. Polyvinyl chloride formed without a plasticizer is preferred. Under certain conditions and with certain precautions, a greater Shore D range of 60 to 90 can be employed. Other thermoplastics with the same hardness test range have also been found suitable, the preferred alternates being polycarbonate, acetal resin and polypropylene. While only a smooth plane surface of the specified material is in contact with the glass, an appreciable thickness of it is required both for rigidity and as allowance for wear. Reinforcing material in the tool is undesirable since it is usually hard and likely to cause scratch-like defects or sleeks.

The exact reason for the effectiveness of the specified hardness range is difficult to explain. All hardnesses in this range are greater than those of polishing felts and less than those of iron grinding runners. Materials near the high end of the range, most safely in the 80 to 85 Shore D test range, have been found most effective for planing the overall large area repeated wave defect condition of float glass. With greater hardness the risk of scratching or sleeking the glass by the abrasive is increased, and an upper limit of 90 is presently the upper limit of safety. With defects of a lesser width to depth ratio than the hundred thousand to one ratio characteristic of float glass, polishing tools below the 80 to 85 range may be employed. For example, squeegee marks on chemically polished glass with width to depth ratios of ten thousand to one may be removed when the pad has a Shore D hardness as low as 60. At this low end of the range, the freedom from sleeking is greater but the planing efficiency is lower. Operation at this limit, however, is of little advantage so long as abrasive control is maintained and planing efficiency is likely to decrease further in the event of heating and softening of the tool during operation.

The Shore D hardness test is a measure of the indentation of the surface of the tested material by a stylus having a 30° included angle when applied with a given force. The scale ranges from 0 to 100 and the test is widely used in hardness rating of material such as hard rubber and hard plastic materials. The Shore D durometer is manufactured by the Shore Instrument and Mfg. Company, Inc., Jamaica, New York. Test measurements were made at room temperature (75° F.). While the materials described are thermoplastic and soften with temperature, a low slope temperature characteristic is preferred so that operating temperature hardness will not be greatly decreased.

The planing tool is best described as a block or pad of substantial thickness and having a plane, smooth, working surface. No facing of the block to retain or incorporate abrasive particles is necessary, and the surface is not changed substantially as the polishing proceeds. Its area is a matter of choice so long as slurry distribution is maintained under all of the block. It should be appreciated that while the process is directed to planing of high production flat glass, it is not intended to replace grinding in generating the overall plane of the glass where the glass as rolled may have thickness variations exceeding one-hundredth of an inch (i.e., 250-microns) over a typical ten-foot glass ribbon width. It is mechanically simpler and generally more practical, however, to rub the large glass areas with large blocks than resort to a correspondingly large number of very small blocks with resulting multiplication or complexity of drive or motion-directing systems.

To keep the abrasive distributed under the block, the block is provided with grooves, holes, or other recesses so as to provide a number of relatively small lands or faces which at their edges can pick up the slurry for working the glass more effectively. While polishing blocks may be several feet in diameter, a sufficiently large number of supply channels or other block edges are preferably provided so that no part of the block is less than an inch from a slurry supply edge. The recesses or edges and resulting slurry distribution increases the glass removal rate for a given block pressure without sacrificing the planing efficiency of the hard block.

(d) Planing abrasive

A reasonably fast cutting or removal rate without either loss of planing efficiency or scratching the glass surface has been obtained only with finely divided abrasives of rare earth oxides of given size in a water slurry between the glass surface and planing tool.

The abrasive material itself is preferably a rare earth (lanthanum) oxide mixture, often used for fast precision optical polishing with a pitch lap. This material cuts much faster than rouge, but is more expensive than rouge. One such rare earth oxide mixture successfully employed is marketed as "Barnesite 85" by the American Potash & Chemical Corporation, of West Chicago, Illinois. The proportions of the various rare earths is determined by the natural occurrence of the various earths in the mineral monazite as pyrophosphates of the cerium group of lanthanums. In processing, the thorium is removed and cerium oxide predominates (around 50%). Other rare earth mixtures or cerium oxide alone can be substituted providing the particle size is controlled.

Abrasive particle size must be rigidly controlled, and an average particle size of around one micron diameter is employed. This is small compared with commonly useful sizes of such abrasives when used for polishing optical glass, and an additional refining operation may be required before commercially available abrasives can be made up in water slurries. A dry air tumbling in which high velocity air jets impinge upon the particles and cause them to impinge upon each other has been found satisfactory. Some of the relatively large particles contained in "Barnesite 85," for example, appear to be lightly bound fusion aggregates or agglomerations of smaller particles, which in fact are reduced to smaller sizes by the dry tumbling process and need not be thrown away.

Since useful separation methods imply a range of sizes reference is made to FIG. 4 for a more complete explanation of the particle size specification. FIG. 4 plots percentage of particles below an indicated size against the particle diameter in (a) freshly made-up slurry, and (b) recycled and reconditioned slurry. Reference to particle sizes in terms of percentage below an indicated size is based on the operation of centrifugal separating systems—such as liquid cyclones—or gravity separation systems—such as settling tanks—which remove the largest or the smallest particles from the remainder. As shown, approximately 50% of the new slurry particles by weight are below one micron diameter and the 50% division occurs at approximately $9/10$ micron diameter for the recycled slurry. With the largest particles below three microns diameter, the size range is considered very small and over half of the particles are with a one-half micron diameter range variation.

The maximum size limitation is primarily designed for the protection of the glass against sleeks which are the limiting defect condition encountered as the block hardness is increased. Sleeks, as the term is used herein, are small scratches, typically long narrow fractures a tenth of a micron deep and not much wider than deep. Sleeks are removable by either planing or polishing, but the problem is to avoid creating more while removing earlier ones. Foreign particles, including small pieces of glass are one cause of sleeking, and the removal of all larger size particles whether abrasive, glass, or other contaminants is the approach successfully employed here. The three micron effective limit associated with the one micron central size in the distribution has been found effective after many trials in minimizing sleeks while maintaining both planing efficiency and high removal with the previously described hard plastic planing blocks.

Our observations indicate that the abrasive particles can be reused many times without any apparent diminution in size or cutting efficiency. The fact remains, however, that continuous recycling of the slurry causes a buildup of glass particle content. These particles are of no harmful effect in moderate quantities and appear to be reduced in size as they themselves are recycled through the glass-runner interface. By eliminating all particles from sizes below a three- to four-tenths microns minimum size, the glass particle buildup is held within working bounds.

Rouge, despite its low cost and extensive use and refinement for plate glass polishing, does not lend itself as an equivalent abrasive. Particle size control has not insured its reliability or disassociated its use from a high incidence of sleeking or pit-type defects in attempts to plane with it.

(e) Slurry control

The slurry contains a small percentage by weight of the specified abrasive in water. Five to ten parts of abrasive to water has been found satisfactory. As previously emphasized, the slurry is continuously circulated, with beneficial result in removing heat generated by the work done in removing the high areas of the glass with the abrasive particles. The process is very much a wet one and is far removed from the nearly dry final stages of rouge and felt polishing. Reuse by addition of water and abrasives to make up losses in "used" slurry and continuous removal of glass and other foreign particles makes the process economical despite the cost of the abrasive.

Velocity and block pressure may vary widely provided slurry circulation is maintained. These are usually balanced to obtain as high a planing removal as can be obtained with a given set of polishing blocks without overheating of the glass or the plastic pads. Temperature differentials rather than absolute temperature are the cause of dangerous stresses in the glass or distorting of the plane of the plastic block. Operation close to the ambient factory temperature is desired, and removal of heat as it is generated is assisted by maintaining a large slurry flow and the large water to abrasive ratio.

Care should be taken, of course, to keep contaminants out of the slurry since the process, while designed for large scale use is microscopic at the size level where discrete glass particles are removed by the one-micron abrasive particles under the plastic block surface.

II. AN APPARATUS INSTALLATION

A finish planing apparatus for glass factory installatoin is shown in FIGS. 1, 2, and 3. As shown in FIG. 1, the glass ribbon 10 is conveyed through a planing station 11 designed in this example for twin planing of a continuously produced nominal quarter inch thickness glass ribbon of the lime-soda-sand composition. A ribbon width of 127 inches and a speed of 150 inches to 200 inches per minute are representative of a modern glass factory production line. Such a glass ribbon may be formed, for example, by a float process as described in Pilkington et al. U.S. Letters Patent No. 2,911,759, granted November 10, 1959.

The ribbon is presented to one or more planing stations for upgrading of the glass by removal of wave type defects previously defined. An abrasive slurry conditioning and recycling system 12 for planing station 11 may also supply further planing stations. The number of on-line stations, if more than one is employed, depends upon defect severity and quality requirements.

The planing station 11, apart from the upper and lower planing blocks 13a and 13b and slurry supply means is conveniently similar to that previously developed for plate glass polishing. As such, it is merely exemplary of factory installations in which the apparatus of the invention may be incorporated for practice of the planing process. In this example, ten runner blocks, each freely rotatable, are positioned in a circular array on an upper runner frame 14a above the ribbon. A similar set of blocks is mounted on a similar runner frame 14b coaxially positioned below the glass. The runner blocks are each circular with a center slurry supply opening and in this example are approximately thirty inches in diameter. The upper and lower frames have motor drive spindles 15a, 15b for rotation at speeds suitably in the vicinity of 50 revolutions per minute. The upper and lower runner assemblies are designed to be brought to bear upon the moving glass between them with average pressures of one to five pounds per square inch of block surface on each side of the glass. Substantial drive power is required—50 to 100 kilowatts on each side of the glass is typical in an installation similar to that here described —since the planing process enables a large amount of work to be usefully expended on a short portion of the glass line. The freely rotating blocks work each glass area in different directions as they sweep out a circular path so as to average out effects of different removal efficiencies under different blocks or block portions. Other multiple array or single block systems may be employed, and individually powered runner blocks of larger or smaller size may, of course, be substituted.

As further shown in FIG. 1, abrasive slurry supply lines 16a and 16b are connected to the upper and lower rotor assemblies. These communicate through the drive spindles with the open center of each of the planing blocks 13a, 13b in the upper and lower circular arrays. A planing station sump 17 collects the slurry from the polishing blocks as it drains off the glass surfaces. The "used" slurry is returned through a return line 18 for recycling as later described.

Turning now to a description of the planing block and slurry supply apparatus of the invention, FIGS. 2 and 3 illustrate a planing block 13a of the FIG. 1 apparatus.

The grooved runner block plastic disk 20 shown in FIG. 2 is backed by a resilient layer, suitably of sponge rubber 21, and a rigid iron backing disk 22 as further shown in FIG. 2. This laminated assembly is preferably cemented together rather than bolted to prevent distortion of the plastic disk surface. The deformable rubber interlayer is designed to facilitate overall conformation of the plastic disk to the glass plane and minimize pressure differentials of the different blocks and different portions of them when the runner assemblies are brought to bear against the glass. This is largely a matter of accommodating lack of precise alinement of the runners and the runner assembly drive and thus avoiding gouging or scraping of the glass.

The plastic material is unplasticized polyvinyl chloride with a Shore D hardness of 80. Plasticizers may be employed (such as tricresyl phosphate) for making softer pads, but as previously explained the planing efficiency is decreased. Unplasticized pads are also preferred since the plasticized pads appear to either increase in softness more rapidly with temperature increase or to invite localized area temperature increases when used under planing conditions.

As particularly shown in FIG. 2, the pad 20 is provided with a center opening 23 as the slurry inlet together with spaced radiating grooves 24 providing escape paths for the slurry. The grooves in a quarter inch thickness pad are suitably one-eighth of an inch wide by one-eighth of an inch deep as further indicated by FIG. 3. Concentric circular grooves 25 and outer radius grooves 26 increase the slurry distribution and provide further planing block edge lengths. With the slurry provided under pressure, slurry runs in the grooves and is fed between the glass and the edges of the grooves of the plastic block by the relative movement of the glass and block defined by a groove. No attempt is made to prevent the escape of the slurry from the runner block.

As further shown in FIG. 1, an abrasive slurry recycling and conditioning system is provided for economic continuous operation. The "used" slurry from the drain line 18 is received in recycling tank 20 and pumped under pressure through line 21 through successive hydrocyclone particle separators 22 and 23. The smaller particles are drawn from the upper center of each cyclone unit while the larger particles thrown to the hydrocyclone periphery eventually drop out at the lower end of the cyclone. With the double refining stage thus provided practically all of the larger particles above three microns in size are removed as indicated in curbe (b) of FIG. 4. Effluent slurry from the cyclones is supplied by line 24 to the feed tank 25.

Slurry to be supplied to the runners is pumped from the feed tank 25 through line 26 to a heat exchanger 27 where it is cooled. It is then apportioned by flow dividing and metering means 28a and 28b to the slurry supply lines 16a and 16b for the runner assemblies. This completes one cycle, but the slurry is recycled indefinitely. The contents of the feed tank 25, and also of the recycling tank 20, are continuously agitated to keep the abrasive suspended in the water. No agitation of the slurry in the runner assembly passages has been found necessary since the continuous flow and high ratio of water to abrasive provides a self-cleaning condition.

The tailings from the lower ends of the cyclones may be discarded but usually contain an appreciable proportion of abrasive particles near one micron in size. They are preferably returned through line 30 and screen 31 to the tank 20. The larger foreign particles are removed by the screen and the remainder is subject to recycling and a repetition of the cyclone separation process.

Slurry losses are due to evaporation, spilling, or leakage, and, to a more limited extent, removal of glass or other foreign particles. The abrasive itself is not appreciably diminished in size when reused and frequent fresh batching is avoided as uneconomical. Periodic removal of a portion of the contents of the recycling tank 20 to settling tank 34 through valve controlled lines 35 or 36 and return through line 37 provides an opportunity to remove the very small (below three-tenths microns) glass particles. Restoration of the recycled slurry in amount and composition is conveniently provided by make-up slurry of the needed water-to-abrasive ratio from a make-up tank 32 through line 33 to the recycle tank.

We claim as our invention:

1. The method of planing flat glass having very wide surface defects on the order of one micron and less in depth comprising rubbing the glass surface with a thermoplastic tool having a Shore D durometer hardness between 60 and 90, while continuously supplying a water slurry of finely divided rare earth abrasives under three microns diameter to the glass-tool interface.

2. The method of upgrading float glass having shallow wave-type surface defects which comprises planing the surface with a thermoplastic tool block having a Shore D durometer hardness of about 80, while continuously supplying a water slurry of finely divided rare earth abrasives less than three microns in diameter until the surface is planed.

3. The method of planing flat glass having very wide shallow surface defects which comprises continuously flowing a water slurry of a finely divided rare earth abrasive having particles below three microns diameter over the glass surface while rubbing the slurry coated surface with a thermoplastic block having a Shore D hardness in the range of 60 to 90, collecting the slurry leaving the glass surface and removing all glass and other particles exceeding the size of the rare earth abrasive particles, and cooling and returning the collected slurry to the glass surface under the plastic block.

4. The method of planing flat glass according to claim 3, wherein said abrasive has an average particle size of about one micron and said thermoplastic block has a Shore D hardness within the range of 80 to 87.

References Cited by the Examiner

UNITED STATES PATENTS

| | | | |
|---|---|---|---|
| 2,309,831 | 2/1943 | Devol et al. | 51—283 |
| 2,426,215 | 8/1947 | Hicks | 51—283 |
| 2,929,176 | 3/1960 | McAuley et al. | 51—283 |
| 2,945,333 | 7/1960 | Touvay et al. | 51—283 |
| 2,955,031 | 10/1960 | Bilton et al. | 51—283 |
| 2,997,816 | 4/1961 | Hoyet et al. | 51—112 |
| 2,990,663 | 7/1961 | Peyches | 51—283 |
| 2,992,521 | 7/1961 | Glasgow | 51—283 |
| 3,107,458 | 10/1963 | Walters | 51—112 |

ROBERT C. RIORDON, *Primary Examiner.*

J. SPENCER OVERHOLSER, HAROLD D. WHITEHEAD, *Examiners.*